(12) United States Patent
Ross et al.

(10) Patent No.: US 8,939,330 B2
(45) Date of Patent: Jan. 27, 2015

(54) REMOVABLE MODULE SERVICE SEAT

(71) Applicant: Graco Minnesota Inc., Minneapolis, MN (US)

(72) Inventors: Daniel P. Ross, Maplewood, MN (US); Paul R. Quam, Brooklyn Center, MN (US); Joseph E. Tix, Hastings, MN (US); Mark T. Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 56 days.

(21) Appl. No.: 13/799,541

(22) Filed: Mar. 13, 2013

(65) Prior Publication Data

US 2014/0263478 A1    Sep. 18, 2014

(51) Int. Cl.
| | |
|---|---|
| *B65D 47/00* | (2006.01) |
| *B67D 3/00* | (2006.01) |
| *B65D 83/00* | (2006.01) |
| *B05B 1/30* | (2006.01) |
| *B05B 1/34* | (2006.01) |

(52) U.S. Cl.
CPC ............................. *B05B 1/30* (2013.01)
USPC ................. 222/559; 222/402.13; 222/402.14; 239/533.15; 239/583

(58) Field of Classification Search
USPC ..................... 222/504, 559, 547, 549, 402.13, 222/402.14; 137/329.1, 329.2, 329.3, 137/329.4, 613; 239/533.1, 533.15, 583, 239/584, 600; 251/360, 361, 362, 363
See application file for complete search history.

(56) References Cited

U.S. PATENT DOCUMENTS

| | | | | |
|---|---|---|---|---|
| 3,348,520 | A | * | 10/1967 | Lockwood ..................... 118/667 |
| 3,563,267 | A | * | 2/1971 | Thompson ................. 137/329.1 |
| 4,190,075 | A | * | 2/1980 | Kayser ........................ 137/329.1 |
| 4,334,637 | A | | 6/1982 | Baker et al. |
| 4,613,078 | A | | 9/1986 | Marshall |
| 5,269,670 | A | | 12/1993 | Allen et al. |
| 5,375,738 | A | | 12/1994 | Walsh et al. |
| 5,598,974 | A | * | 2/1997 | Lewis et al. ................... 239/135 |
| 5,728,219 | A | | 3/1998 | Allen et al. |
| 5,873,528 | A | * | 2/1999 | Lewis et al. ................... 239/135 |
| 5,875,922 | A | | 3/1999 | Chastine et al. |
| 6,210,141 | B1 | | 4/2001 | Allen |
| 6,260,583 | B1 | | 7/2001 | Flatt et al. |
| 6,378,784 | B1 | | 4/2002 | Allen et al. |
| 6,811,095 | B2 | | 11/2004 | Donley et al. |
| RE39,399 | E | | 11/2006 | Allen |
| 7,182,229 | B2 | | 2/2007 | Gould et al. |
| 7,626,143 | B2 | | 12/2009 | Miller |
| 7,770,760 | B2 | | 8/2010 | McGuffey et al. |
| 7,857,173 | B2 | | 12/2010 | Bolyard, Jr. |
| 8,069,653 | B2 | * | 12/2011 | Ganzer ........................... 60/286 |
| 2006/0157517 | A1 | * | 7/2006 | Fiske et al. ..................... 222/504 |
| 2009/0095825 | A1 | * | 4/2009 | Ahmadi et al. ............... 239/583 |

(Continued)

*Primary Examiner* — J. Casimer Jacyna
*Assistant Examiner* — Benjamin R Shaw
(74) *Attorney, Agent, or Firm* — Kinney & Lange, P.A.

(57) ABSTRACT

A fluid dispensing valve comprises a module, a discharge tip, a valve stem and a movable service seat. The module has a fluid inlet, a fluid outlet, and a fluid passage connecting the fluid inlet and the fluid outlet. The discharge tip is removably mounted to the module and in fluid communication with the fluid outlet. The valve stem extends into the fluid passage to close-off the discharge tip. The movable service seat surrounds the valve stem within the fluid passage between the discharge tip and the fluid inlet. The service seat is configured to seal the fluid passage when the discharge tip is removed.

27 Claims, 5 Drawing Sheets

(56) References Cited

U.S. PATENT DOCUMENTS

| | | | |
|---|---|---|---|
| 2009/0101669 A1* | 4/2009 | Hassler et al. | 222/1 |
| 2009/0266844 A1 | 10/2009 | McGuffey | |
| 2011/0114673 A1* | 5/2011 | Fiske et al. | 222/146.1 |

* cited by examiner

REMOVABLE MODULE SERVICE SEAT

BACKGROUND

The present disclosure relates generally to systems for dispensing hot melt adhesive. More particularly, the present disclosure relates to service seats for dispense modules having valves from which melted hot melt adhesive is applied.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

A service seat provides a secondary means for closing the valve within the dispense module when the primary, dispensing valve seat is removed. For example, the dispensing valve seat may be removed to perform maintenance, such as to clean debris or char from a dispense orifice within the dispensing valve seat. Conventional dispense modules have service seats that are configured to engage a transition section of the valve stem that is used to actuate the dispense module. One such dispense module is disclosed in U.S. Pat. No. 5,873,528 to Lewis et al. However, configuring the valve stem to engage the service seat requires additional machining of the valve stem, which adds to the expense of the valve stem.

SUMMARY

According to one embodiment of the present disclosure, a fluid dispensing valve comprises a module, a discharge tip, a valve stem and a movable service seat. The module has a fluid inlet, a fluid outlet, and a fluid passage connecting the fluid inlet and the fluid outlet. The discharge tip is removably mounted to the module and in fluid communication with the fluid outlet. The valve stem extends into the fluid passage to close-off the discharge tip. The movable service seat surrounds the valve stem within the fluid passage between the discharge tip and the fluid inlet. The service seat is configured to seal the fluid passage when the discharge tip is removed.

According to another embodiment of the present disclosure, a fluid dispensing valve comprises a body, a tip cap, a valve stem, a floating seat, a spring and a lifter. The body has a fluid passage. The tip cap is connected to the body so to be in fluid communication with the fluid passage. The valve stem extends through the fluid passage to the tip cap. The floating seat surrounds the valve stem within the fluid passage. The spring is configured to bias the floating seat toward the fluid passage. The lifter is disposed between the tip cap and the service seat and is configured to push the floating seat away from the fluid passage.

DETAILED DESCRIPTION

Figure 1:
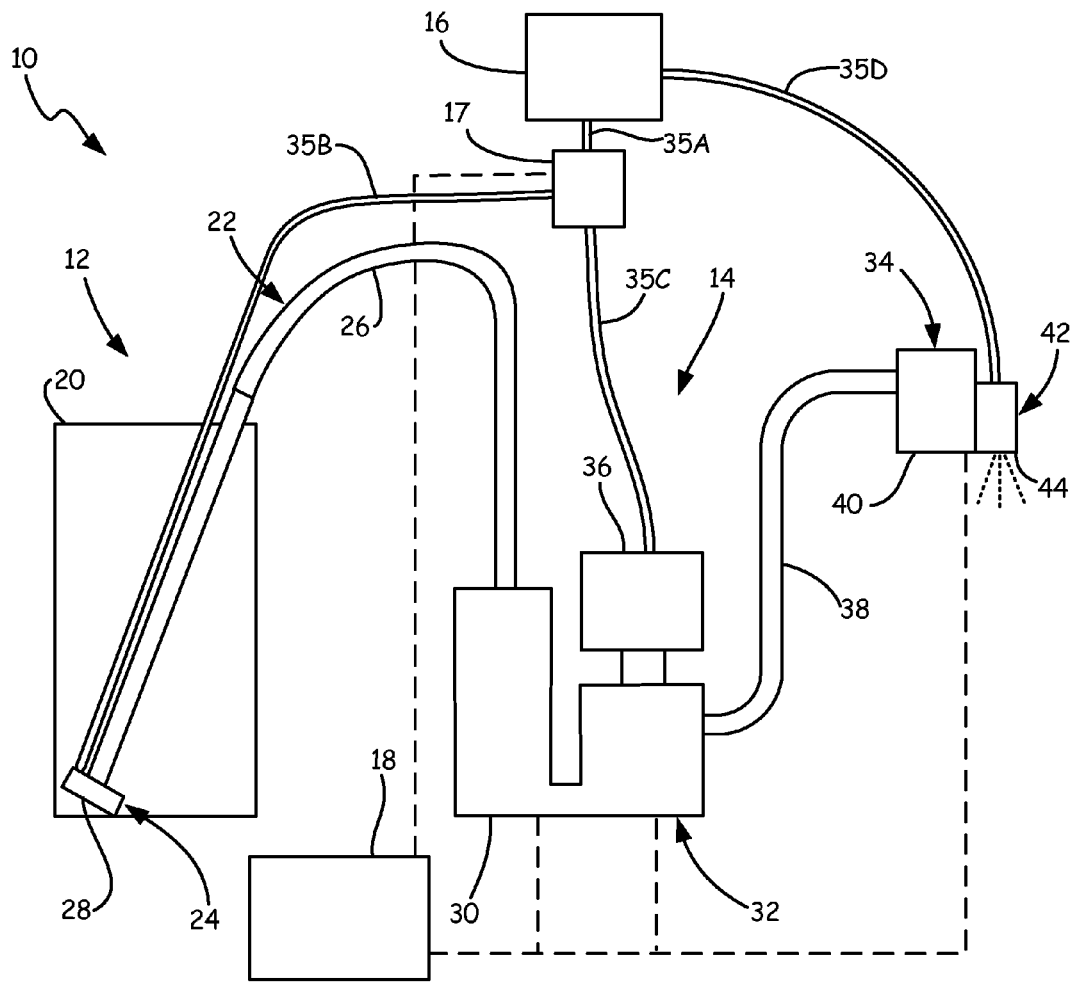
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container (not shown) and resistive heating elements (not shown) for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by compressed air from air source 16 and air control valve 17. Pump 32 can be a linear displacement pump driven by motor 36.

In the illustrated embodiment, dispenser 34 includes manifold 40 and dispensing module 42. Hot melt adhesive from pump 32 is received in manifold 40 and dispensed via module 42. Dispenser 34 can selectively discharge hot melt adhesive whereby the hot melt adhesive is sprayed out outlet 44 of module 42 onto an object, such as a package, a case, or another object benefiting from hot melt adhesive dispensed by system 10. Module 42 can be one of multiple modules that are part of dispenser 34. In an alternative embodiment, dispenser 34 can have a different configuration, such as a hand-held gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2:
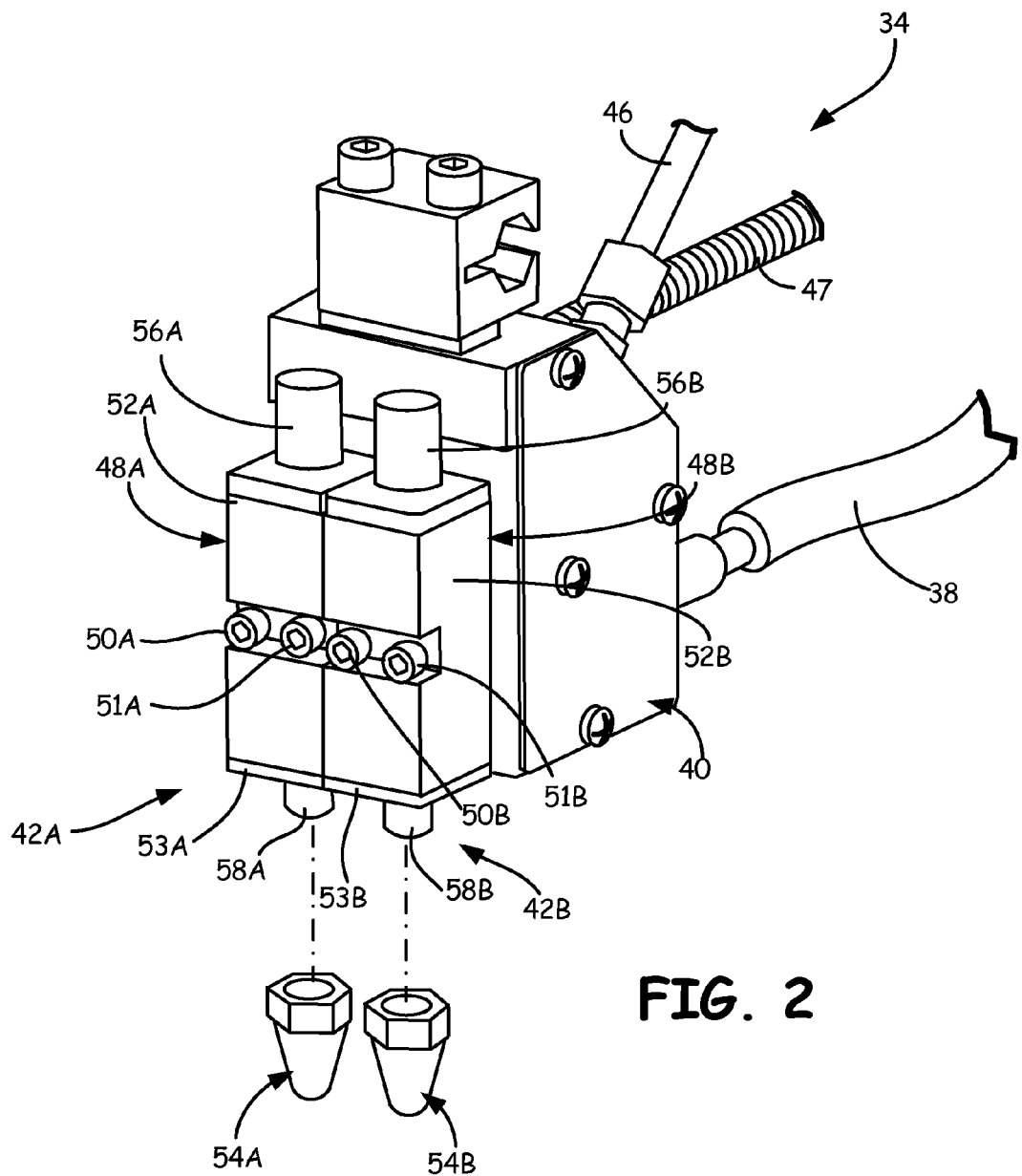
FIG. 2 is a perspective view of a hot melt manifold shown in FIG. 1 coupled to dispense modules having removable internal tip filters and service seats.

FIG. 2 is a perspective view of dispenser 34 of FIG. 1 comprising hot melt manifold 40 coupled to dispense modules 42A and 42B, which include removable service seats and filters of the present disclosure. In the embodiment shown, manifold 40 includes inlet ports for receiving melted hot melt adhesive from supply hose 38, compressed air from air line 46 and control and power wires from conduit 47. Manifold 40 supplies both melted hot melt adhesive and compressed air to modules 42A and 42B. Modules 42A and 42B include module housings 48A and 48B, which are connected to manifold 40 via fasteners 50A and 51A, and 50B and 51B, respectively. Modules 42A and 42B also include tip plugs 53A and 53B, respectively. Module housing 48A comprises valve body 52A, which is connected to tip cap 54A and actuation cap 56A. Module housing 48B comprises valve body 52B, which is connected to tip plug 53B and actuation cap 56B. Actuation caps 56A and 56B provide access to valve stems within valve bodies 52A and 52B. Actuation caps 56A and 56B may also include vent ports (not shown) for discharging compressed air from air line 46 used to actuate the valve stems. Tip plugs 53A and 53B include discharge portions 58A and 58B, respectively, which connect to tip caps 54A and 54B. Tip caps 54A and 54B include valve seats having orifices that receive the tip of the valve stem.

Configured as such, compressed air from air line 46 actuates the valve stems to open a hot melt fluid passageway from supply hose 38, through manifold 40 and module housings 48A and 48B, to discharge portions 58A and 58B. The present disclosure relates to service seats and filters that are positioned within module housings 48A and 48B to prevent debris, such as charred hot melt material from clogging or plugging discharge portions 58A and 58B, or tip plugs 53A and 53B. Tip caps 54A and 54B can be removed from tip plugs 53A and 53B to enable the service seats to close dispense modules 42A and 42B, thereby allowing access to the filters within valve bodies 52A and 52B while flow of material through dispense modules 42A and 42B is stopped.

Figure 3:
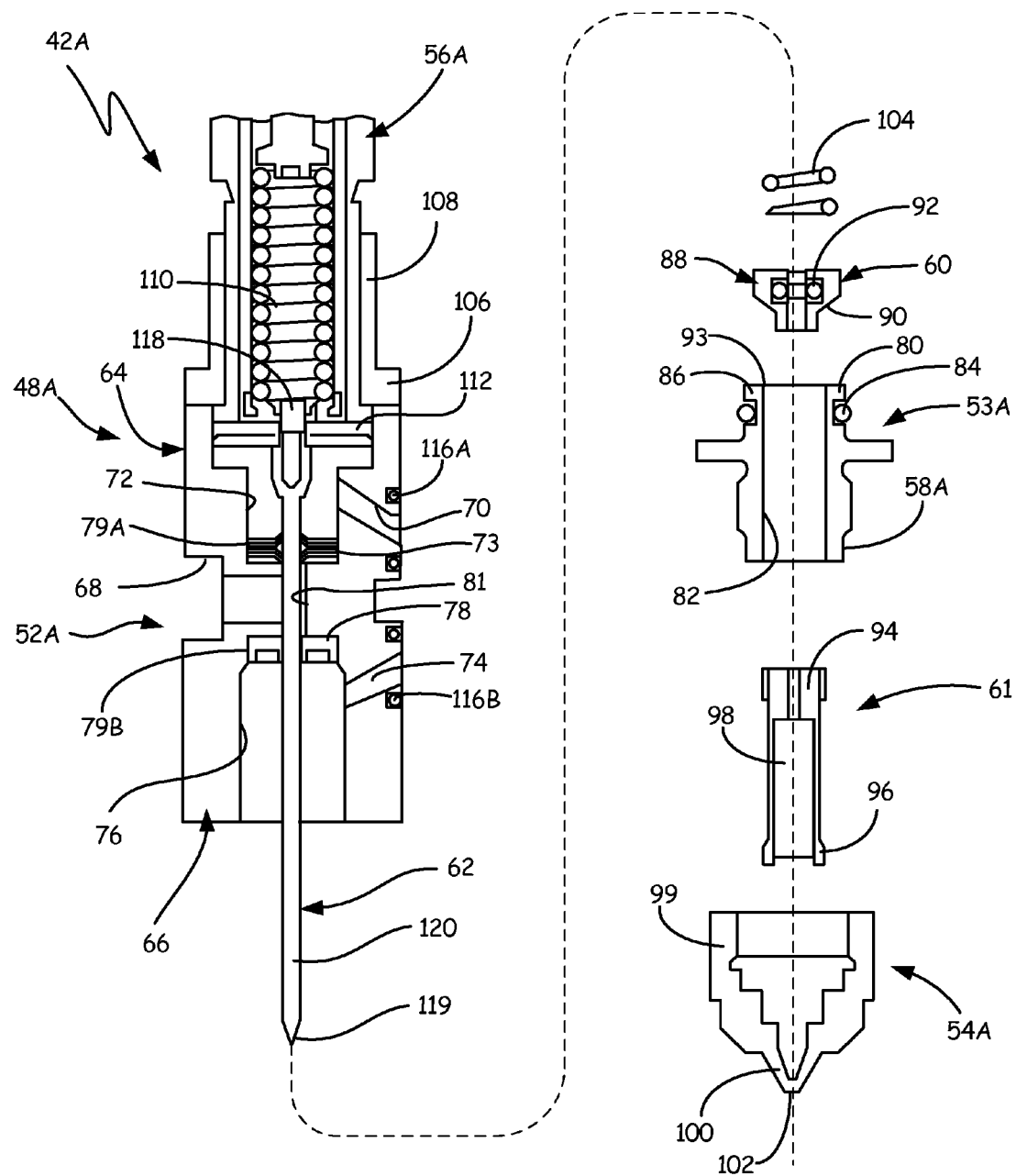
FIG. 3 is an exploded view of a dispense module of FIG. 2 showing a removable tip filter and a service seat relative to a valve stem and a tip cap.

FIG. 3 is an exploded view of dispense module 42A of FIG. 2 showing service seat 60 and filter 61 surrounding valve stem 62. Module housing 48A includes valve body 52A, which connects to tip plug 53A and actuation cap 56A. Valve body 52A includes actuation portion 64 and valve portion 66. Actuation portion 64 includes slot 68, air inlet port 70, air port 72 and air seal bore 73. Valve portion 66 includes adhesive inlet port 74, valve passage 76 and adhesive seal bore 78. Seals 79A and 79B sit within seal bores 73 and 78, respectively, to seal around valve stem 62. Valve stem 62 is configured to extend through bore 81 in valve body 52A to intersect air port 72 and valve passage 76.

Tip plug 53A includes collar 80 and discharge portion 58A, through which lower valve passage 82 is configured to extend to receive valve stem 62. Tip plug 53A further includes seal 84, which is disposed in channel 86, to seal against valve passage 76. Service seat 60 includes seat body 88, seal face 90, and seal 92, which are configured to concentrically surround valve stem 62. Seat body 88 is configured to be disposed between collar 80 and seal 79B within valve passage 76 such that seal face 90 engages seat face 93 of lower valve passage 82. Filter 61 includes bearing 94, frame 96 and filter media 98, which are configured to concentrically surround valve stem 62. Filter 61 is configured to be positioned between service seat 60 and tip cap 54A within lower valve passage 82. Tip cap 54A includes body 99 and seat 100, which includes orifice 102 that aligns with valve stem 62. Body 99 couples to discharge portion 58A, while spring 104 is positioned around valve stem 62 between service seat 60 and seal 79A.

Actuation cap 56A includes flange 106 and tower 108 in which spring 110 is positioned. Flange 106 joins to actuation portion 64, such as by the use of fasteners, to position spring 110 against piston 112, which is coupled to valve stem 62. Spring 110 maintains piston 112 and valve stem 62 in a downward position such that valve stem 62 engages seat 100 until dispense module 42A is actuated.

Slot 68 comprises a channel in which heads of fasteners 50A, 50B, 51A and 51B (FIG. 2) are disposed when used to join module housing 48A to manifold 40 (FIG. 2). As such, air inlet port 70 and adhesive inlet port 74 are pressed against discharge ports (not shown) in manifold 40 (FIG. 2) to receive compressed air and molten hot melt adhesive, respectively. Seals 116A and 116B, which can be embedded within channels in valve body 52A, are positioned around air inlet port 70 and adhesive inlet port 74, respectively, to prevent leaking of fluids from between manifold 40 and module housing 48A.

Figure 4A:
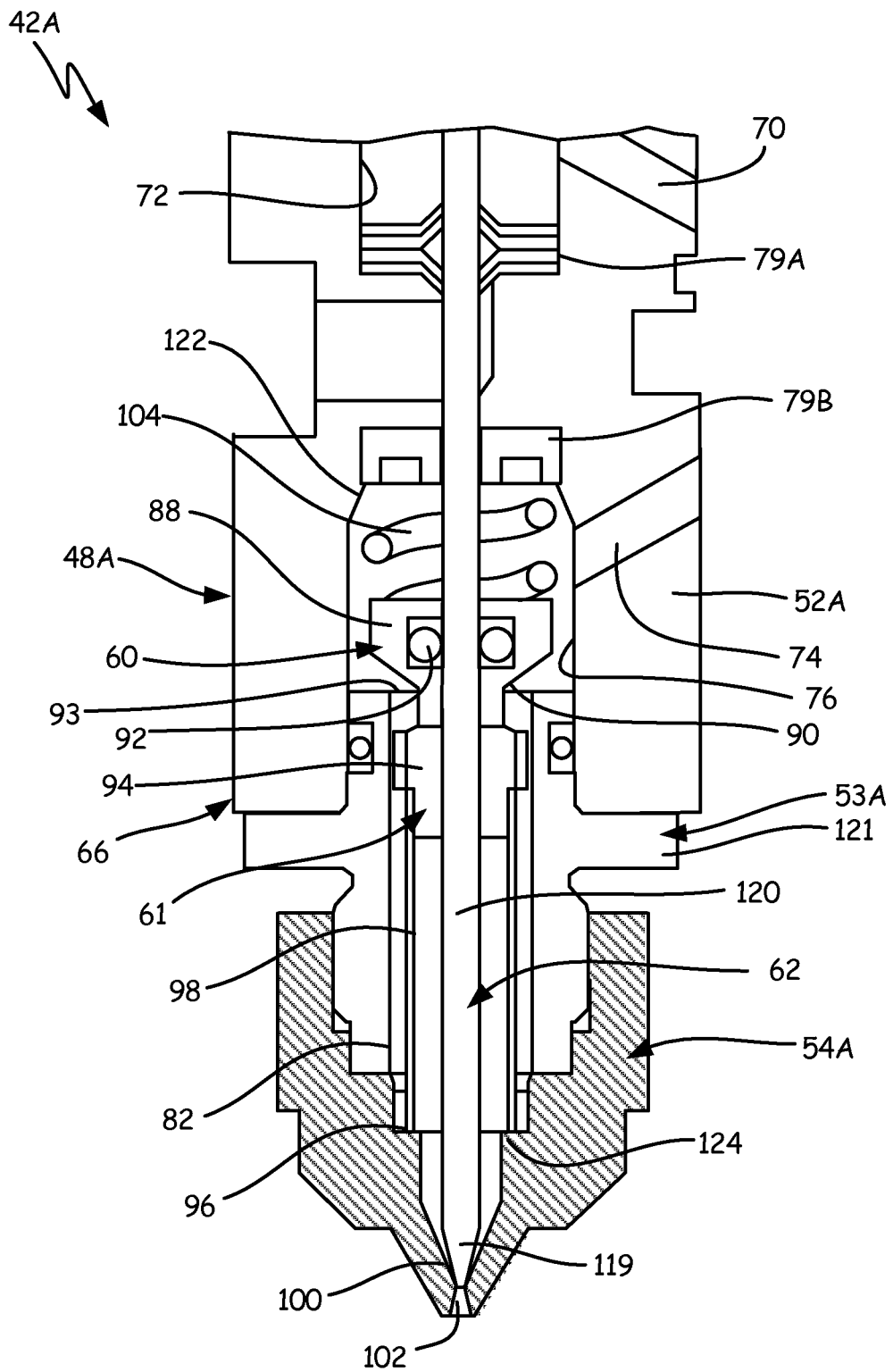
FIG. 4A is a cross-sectional view of the dispense module of FIG. 3 showing the service seat in an open state.
Figure 4B:
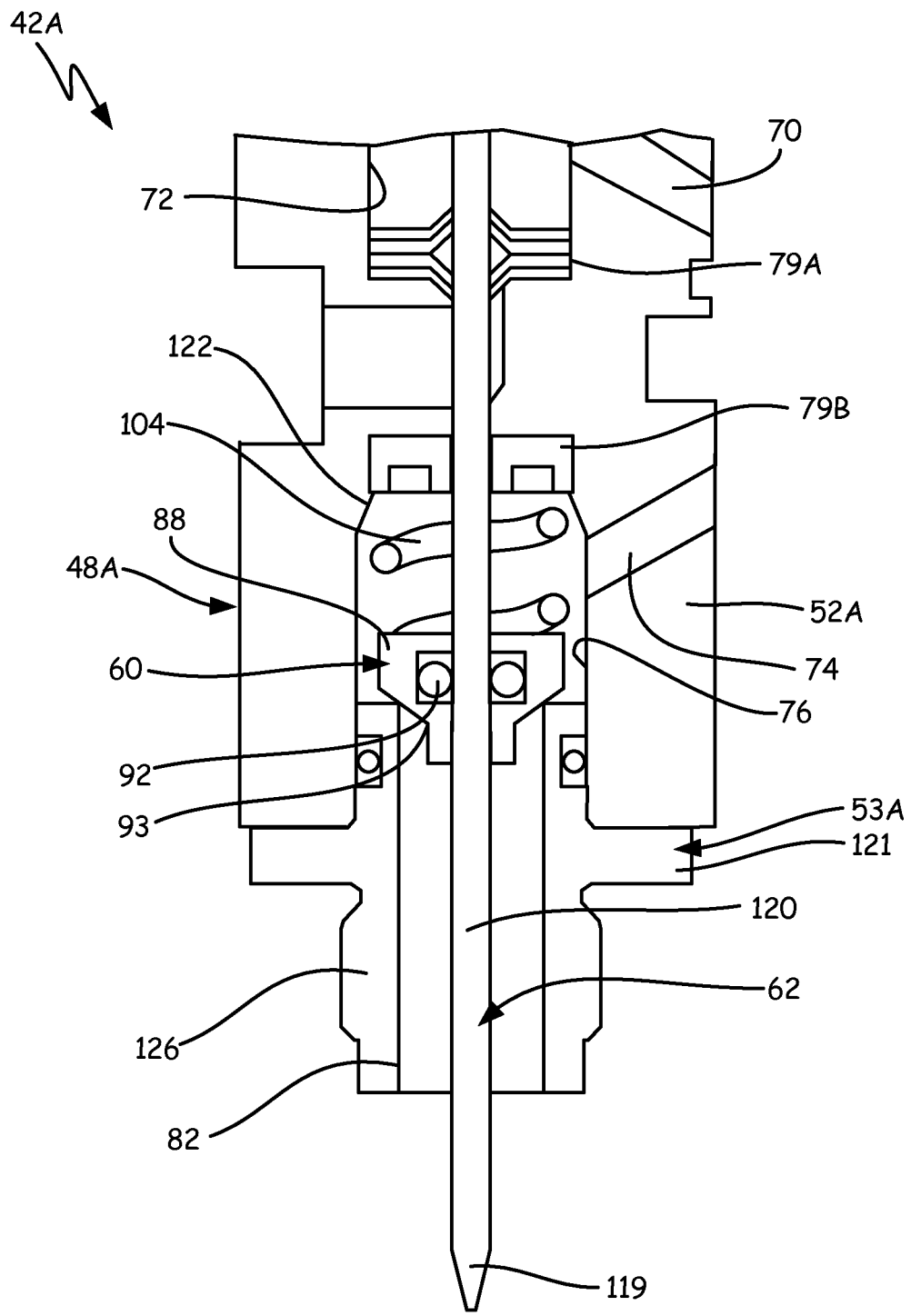
FIG. 4B is a cross-sectional view of the dispense module of FIG. 3 showing the service seat in a closed state with the tip filter and tip cap removed.

Flange 106 of actuation cap 56A holds tower 108 in engagement with valve body 52A to bias spring 110 against piston 112. When assembled, collar 80 of tip plug 53A holds discharge portion 58A in engagement with valve passage 76 of valve body 52A, such as through a press fit, and body 99 of tip cap 54A is assembled to discharge portion 58A of tip plug 53A, such as through a threaded engagement. Thus, seat 100, through filter 61, pushes service seat 60 toward seal 79B, thereby compressing spring 104 and moving seal face 90 away from seat face 93, as shown in FIG. 4A, to enable flow of molten hot melt adhesive through valve passage 76 for operation of dispense module 42A. As shown in FIG. 4B, when tip cap 54A is removed, spring 104 pushes service seat 60 into engagement with seat face 93 to prevent molten hot melt adhesive from flowing through module housing 48B so that maintenance can be performed on dispense module 42A.

FIG. 4A is a cross-sectional view of dispense module 42A of FIG. 3 showing service seat 60 in an open state. FIG. 4A includes elements bearing the same reference numerals as shown in FIG. 3.

Collar 80 of tip plug 53A is inserted into valve passage 76 and secured to module housing 48A, such as via fasteners extending through flange 121. Body 99 of tip cap 54A is secured to tip plug 53A, such as via a threaded engagement. Service seat 60, filter 61 and spring 104 are positioned around valve stem 62 between seal 79B and seat 100 of tip cap 54A. Valve passage 76 includes shoulder 122 against which spring 104 pushes to prevent engagement with seal 79B. Filter 61 includes bearing 94, frame 96 and filter media 98, and is positioned within tip plug 53A. Frame 96 of filter 61 rests atop shoulder 124 in tip cap 54A. Filter media 98 extends from frame 96 to bearing 94. Bearing 94 forms a bore through which shaft 120 is allowed to travel to center valve stem 62 within lower valve passage 82 for alignment with orifice 102. Filter media 98 may be reinforced with struts (not shown) connecting frame 96 and bearing 94.

Service seat 60 rests atop bearing 94 such that seal face 90 axially aligns with seat face 93. Seal 92 is positioned around shaft 120 within seat body 88 to inhibit flow of molten hot melt adhesive through the inner diameter service seat 60. In various embodiments, seal 92 may comprise an o-ring, a u-cup, or a v-packing. Spring 104 sits atop seat body 88 and pushes against shoulder 122, thus allowing service seat 60 to float between shoulder 122 and bearing 94. Once assembled, tip cap 54A holds service seat 60, filter 61 and spring 104 in a fixed state during operation of dispense module 42A. In other words, valve stem 62 is free to engage and disengage seat 100 without interference from service seat 60, filter 61 and spring 104.

During operation of dispense module 42A, flow of compressed air from compressed air source 16 (FIG. 1) to module housing 48B is controlled by controller 18 (FIG. 1) to actuate valve stem 62 for desired intervals, thereby dispensing a corresponding amount of molten hot melt adhesive from orifice 102. Compressed air from air inlet port 70 enters air port 72 and pushes piston 112 (FIG. 3) upwards (with reference to FIG. 3) to compress spring 110 (FIG. 3). Through fastener 118 (FIG. 3), valve stem 62 is moved upward so that tip 119 of valve stem 62 is lifted from seat 100. This permits molten hot melt adhesive from adhesive inlet port 74 to flow from valve passage 76 out of orifice 102 in tip cap 54A. Seal 79A surrounds shaft 120 of valve stem 62 within actuation portion 64 and prevents air from entering valve portion 66. Likewise, seal 79B surrounds shaft 120 within valve portion 66 and prevents hot melt material from entering actuation portion 64. After a dispensing operation is complete, controller 18 (FIG. 1) ceases flow of compressed air to inlet port 70, which enables spring 110 (FIG. 3) to push valve stem 62 back into engagement with seat 100 to cut-off flow of molten hot melt adhesive from module housing 48A.

Filter 61 is positioned in lower valve passage 82 to catch small particles of dust, dirt, char and the like before they are allowed to reach seat 100 and potentially form a clog. In particular, molten hot melt adhesive from inlet port 74 passes into valve passage 76, around service seat 60 and into lower valve passage 82. Within lower valve passage 82, the molten hot melt adhesive travels around the outer diameter of bearing 94, then passes through filter media 98 and the inner diameter of frame 96. Thus, in the disclosed embodiment of FIG. 3, filter 61 comprises an outside-in filter in which filtered matter is prevented from entering filter 61 and is left outside of filter 61. From frame 96 the molten hot melt adhesive passes into tip cap 54A and, depending on the position of tip 119, through orifice 102. Debris and particles screened-out by filter media 98 collect within valve body 52A between filter media 98 and the surfaces of lower valve passage 82. Tip cap 54A is removed from valve body 52A to clean or replace filter media 98 and remove collected particles from inside valve body 52A. With tip cap 54A removed, service seat 60 is pushed by spring 104 into seat face 93 to prevent flow through dispense module 42A.

FIG. 4B is a cross-sectional view of dispense module 42A of FIG. 3 showing service seat 60 in a closed state. FIG. 4B shows dispense module 42A with tip cap 54A (FIG. 3) and filter 61 (FIG. 3) removed. All other components of FIG. 4B include like-numbered reference numerals as those of FIG. 4A. Valve body 52A is mounted to manifold 40 (FIG. 2) and remains stationary as dispense module 42A is actuated. Tip plug 53A remains attached to valve body 52A, such as via threaded fasteners (not shown) extending through flange 121. Tip cap 54A is removed from tip plug 53A, such as by disengaging mating threads (not shown) on tip cap 54A from threads 126.

During operation, valve stem 60 moves up and down (with reference to FIG. 4B) to dispense molten hot melt adhesive from dispense module 42A. With tip cap 54A removed, valve stem 60 is prevented from falling through valve passage 76 via engagement of piston 112 (FIG. 3) with valve body 52A. However, filter 61 (FIG. 3) is allowed to slide off of shaft 120 with tip cap 54A removed. Service seat 60 also slides along shaft 120 under force from spring 104. Spring 104 thus expands between shoulder 122 and tip plug 53A, pushing seal face 90 of service seat 60 against seat face 93. Tip plug 53A arrests movement of service seat 60 due to coupling to housing body 52A. Engagement of seal face 90 and seat face 93 prevents molten hot melt adhesive from inlet port 74 from passing through valve passage 76 into lower valve passage 82 within tip plug 53A. In one embodiment, service seat 60 is fabricated from a resilient material to facilitate sealing with seat face 93.

With tip cap 54A removed, filter 61 (FIG. 3) and orifice 102 in seat 100 of tip cap 54A (FIG. 3) can be cleaned of debris or clogging, or can be replaced with new of clean parts. Molten hot melt adhesive is prevented from leaving dispense module 42A with service seat 60 moved to a closed position. Thus, residual molten hot melt adhesive within system 10 (FIG. 1) will not leak from dispense module 42A during maintenance service. Alternatively, system 10 need not be completely shut down and cooled to a temperature where the molten hot melt adhesive solidifies before a maintenance service can be conducted. Service seat 60 and seat face 93 are positioned in close proximity to inlet port 74. This minimizes the amount of molten hot melt adhesive that enters valve body 52A, and maintains this molten hot melt adhesive closer to heated components of system 10 (FIG. 1). This reduces the possibility of the molten hot melt adhesive within dispense module 42A from solidifying before maintenance of filter 61 and tip cap 54A can be completed.

Service seat 60 is a separate component of dispense module 42A and can thus removed from housing body 52A for cleaning or replacement. Furthermore, the presence of movable service seat 60 simplifies the production of other components of dispense module 42A. For example, a dedicated service seat need not be machined into tip cap 54A, tip plug 53A or housing body 52A. Further, shaft 120 of valve stem 62 need not be machined to include features to close-off such a dedicated a service seat on tip cap 54A, tip plug 53A or housing body 52A. Thus, manufacturing expense of dispense module 42 can be reduced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A fluid dispensing valve comprising:
   a module having:
      a fluid inlet;
      a fluid outlet; and
      a fluid passage connecting the fluid inlet and the fluid outlet;
   a discharge tip removably mounted to the module and in fluid communication with the fluid outlet;
   a valve stem extending into the fluid passage to close-off the discharge tip; and
   a movable service seat surrounding the valve stem within the fluid passage between the discharge tip and the fluid inlet, the service seat configured to seal the fluid passage when the discharge tip is removed, wherein the movable service seat includes a seal that seals against the valve stem.

2. The fluid dispensing valve of claim 1 wherein the movable service seat is biased to an open position by the discharge tip overcoming a spring force.

3. The fluid dispensing valve of claim 1 wherein the seal is selected from the group consisting of: an o-ring, v-packings, and u-cups.

4. The fluid dispensing valve of claim 1 and further comprising a spring to bias the movable service seat in a direction toward the discharge tip.

5. The fluid dispensing valve of claim 4 wherein the fluid passage includes a shoulder toward which the spring biases the movable service seat.

6. The fluid dispensing valve of claim 5 and further comprising a filter extending between the movable service seat and the discharge tip, wherein the filter pushes the movable service seat away from the shoulder when the discharge tip is mounted to the module.

7. The fluid dispensing valve of claim 6 and further comprising a bearing positioned between the filter and the movable service seat.

8. The fluid dispensing valve of claim 6 wherein the includes a filter medium coaxially positioned around the valve stem.

9. The fluid dispensing valve of claim 1 wherein the movable service seat is comprised of a resilient material.

10. The fluid dispensing valve of claim 1 wherein the movable service seat is separable from the valve stem and the module.

11. A fluid dispensing valve comprising:
   a body having a fluid passage;
   a tip cap connected to the body so to be in fluid communication with the fluid passage;
   a valve stem extending through the fluid passage to the tip cap;
   a floating seat surrounding the valve stem within the fluid passage;
   a spring configured to bias the floating seat in a direction toward the tip cap; and
   a lifter disposed between the tip cap and the floating seat and configured to push the floating seat away from the fluid passage.

12. The fluid dispensing valve of claim 11 wherein the lifter comprises:
   an eleongate frame; and
   filter media lining the elongate frame to prevent contaminants from passing through the tip cap.

13. The fluid dispensing valve of claim 12 wherein the lifter further comprises a bearing to guide the valve stem.

14. The fluid dispensing valve of claim 11 wherein the body further comprises:
   a tip plug that partially defines the fluid passage; and
   a shoulder along the fluid passage defined by the tip plug;
   wherein the floating seat engages the shoulder when the tip cap is removed from the body.

15. The fluid dispensing device of claim 14 wherein:
   the tip plug is removable from the body; and
   the floating seat is removable from the valve stem.

16. The fluid dispensing device of claim 14 wherein the floating seat comprises:
   an annular body having:
      an inner channel with a seal; and
      an outer surface defining a seat face to engage the shoulder.

17. A fluid dispensing valve comprising:
   a module body having:
      a fluid passage extending along an axis between a sealed first end and an open second end; and
      a fluid inlet intersecting the fluid passage between the sealed first end and the open second end;
   a tip cap coupled to the module body at the open second end, the tip cap including a discharge orifice;
   a valve stem comprising:
      a shaft extending into the sealed first end and out of the open second end; and
      a tip for engaging the discharge orifice;
   a filter positioned in the fluid passage and that extends from the tip cap;
   a service seat positioned within the fluid passage adjacent the filter; and
   a spring configured to push the service seat and filter against the tip cap.

18. The fluid dispensing valve of claim 17 wherein the filter comprises:
   a frame seated on the tip cap;
   a bearing; and
   a filter element extending between the frame and bearing.

19. The fluid dispensing valve of claim 17 and further comprising:
   a shoulder in the fluid passage;
   wherein the filter pushes the service seat away from the shoulder when the tip cap is assembled to the module body to permit fluid flow through the fluid passage; and
   wherein the spring is configured to push the service seat against the shoulder when the tip cap is removed from the module body to prevent fluid flow through the fluid passage.

20. A fluid dispensing valve comprising:
   a module having:
      a fluid inlet;
      a fluid outlet; and
      a fluid passage connecting the fluid inlet and the fluid outlet, the fluid passage including a shoulder;
   a discharge tip removably mounted to the module and in fluid communication with the fluid outlet;
   a valve stem extending into the fluid passage to close-off the discharge tip; and
   a movable service seat surrounding the valve stem within the fluid passage between the discharge tip and the fluid inlet, the service seat configured to seal the fluid passage when the discharge tip is removed;

a spring to bias the movable service seat toward the shoulder; and a filter extending between the movable service seat and the discharge tip, wherein the filter pushes the movable service seat away from the shoulder when the discharge tip is mounted to the module.

21. The fluid dispensing valve of claim 20 wherein the movable service seat is biased to an open position by the discharge tip overcoming a spring force.

22. The fluid dispensing valve of claim 20 and further comprising a bearing positioned between the filter and the movable service seat.

23. The fluid dispensing valve of claim 20 wherein the filter includes a filter medium coaxially positioned around the valve stem.

24. The fluid dispensing valve of claim 20 wherein the movable service seat is comprised of a resilient material.

25. The fluid dispensing valve of claim 20 wherein the movable service seat is separable from the valve stem and the module.

26. A fluid dispensing valve comprising:
a module having:
    a fluid inlet;
    a fluid outlet; and
    a fluid passage connecting the fluid inlet and the fluid outlet;
a discharge tip removably mounted to the module and in fluid communication with the fluid outlet;
a valve stem extending into the fluid passage to close-off the discharge tip; and
a movable service seat surrounding the valve stem within the fluid passage between the discharge tip and the fluid inlet, the service seat configured to seal the fluid passage when the discharge tip is removed, wherein the movable service seat is separable from the valve stem and the module.

27. A fluid dispensing valve comprising:
a module having:
    a fluid inlet;
    a fluid outlet; and
    a fluid passage connecting the fluid inlet and the fluid outlet, the fluid passage including a shoulder;
a discharge tip removably mounted to the module and in fluid communication with the fluid outlet;
a valve stem extending into the fluid passage to close-off the discharge tip; and
a movable service seat surrounding the valve stem within the fluid passage between the discharge tip and the fluid inlet, the service seat configured to seal the fluid passage when the discharge tip is removed, wherein the movable service seat is separable from the valve stem and the module; and
a spring to bias the movable service seat toward the shoulder.

* * * * *